Feb. 5, 1929.

H. J. CRABBS

MOUNTING FOR ELECTRICAL DEVICES

Filed July 28, 1923    2 Sheets-Sheet 2

1,700,882

WITNESSES:

INVENTOR
Herbert J. Crabbs.
BY
ATTORNEY

Patented Feb. 5, 1929.

1,700,882

UNITED STATES PATENT OFFICE.

HERBERT J. CRABBS, OF PITTSBURGH, PENNSYLVANIA, ASSIGNOR TO WESTINGHOUSE ELECTRIC & MANUFACTURING COMPANY, A CORPORATION OF PENNSYLVANIA.

MOUNTING FOR ELECTRICAL DEVICES.

Application filed July 28, 1923. Serial No. 654,329.

My invention relates to disconnecting switches and more particularly to means for facilitating the assembly thereof.

One object of my invention is to provide a disconnecting switch that is easily and readily assembled in the field.

Another object of my invention is to provide a disconnecting switch which is accessible both from the front and back of the mounting.

A further object of my invention is to provide a mounting for a disconnecting switch which is composed of a plurality of adjustable supporting strips which define openings therebetween.

It is another object of my invention to provide a disconnecting switch, the substantially identical parts of which are adapted for either front or rear connection.

It is also an object of my invention to provide supporting clamps for the insulators incidental to disconnecting switches, which may be assembled with said insulators and handled as a unit.

As is well known, disconnecting switches are a necessary part of all transmission lines. The circumstances surrounding the use of these disconnecting switches and the associated structures vary greatly and, accordingly, it has heretofore been found necessary to provide a great many types of disconnecting switches to meet the many and varied requirements.

I propose to provide a disconnecting switch and supporting mounting in which it is only necessary to change the supporting insulators in order to meet the requirements for the many different types. I also propose to construct a disconnecting switch that is readily assembled in the field from the several elements constituting the finished switch, thereby eliminating the necessity for transporting the disconnecting switch in its assembled form. Other objects and advantages of my disconnecting switch will hereinafter appear.

In the accompanying drawings.

In the several figures of the drawing, like reference numerals indicate similar parts.

Figure 1:
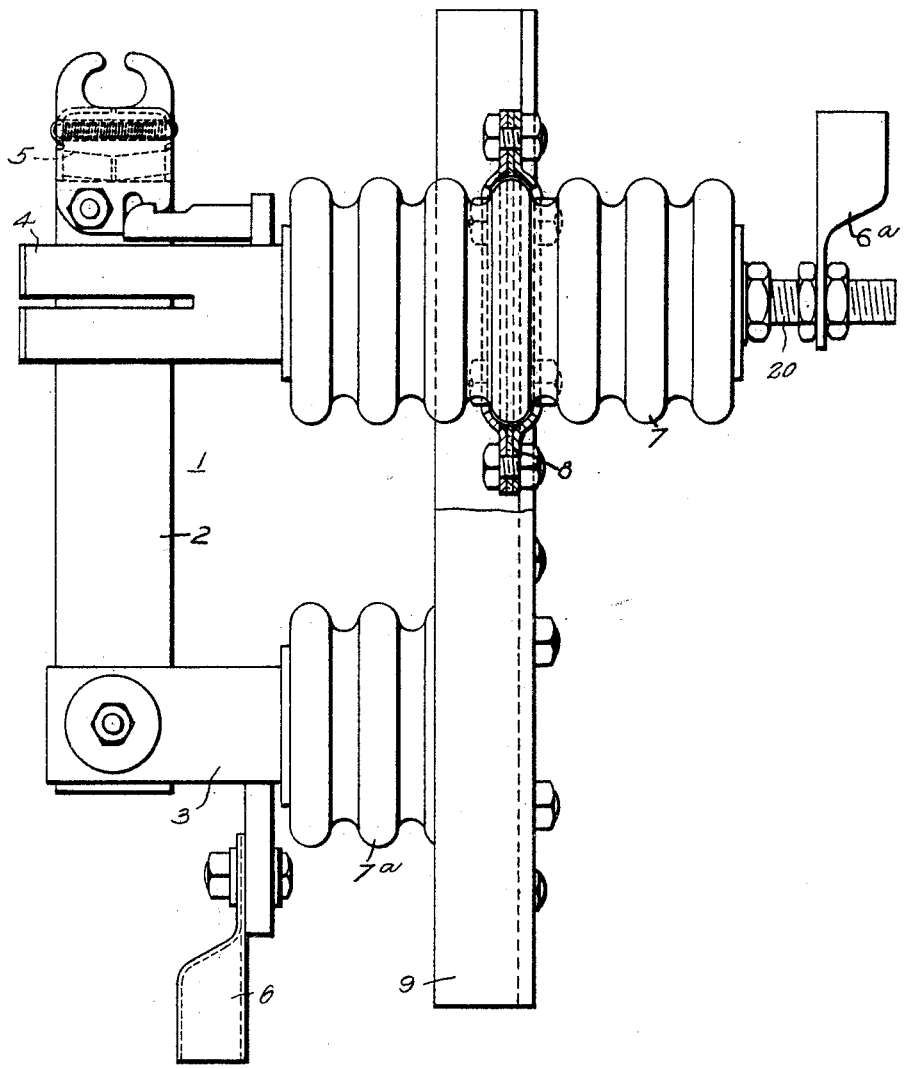
Fig. 1 is a view, partially in elevation and partially in section, of a disconnecting switch having one jaw rear connected and one jaw front connected, embodying my invention.

In the preferred form of my invention, shown in the drawings, a disconnecting switch 1 comprises a blade member 2, a pivoted supporting jaw 3 and a contact jaw 4. Suitable latching means 5 may be placed on the blade 2, if desired. The latching means, here shown, form no part of the present invention, but are shown and described in the application of Christian Aalborg, Serial No. 446,258, filed February 19, 1921, which is assigned to the Westinghouse Electric & Manufacturing Company.

Suitable terminal members 6 and 6a are associated with the jaw members 3 and 4. The jaw members 3 and 4 are mounted on insulators 7 and 7a which are, in turn, supported by suitable clamping means 8 on a mounting which comprises spaced-metallic supports 9, preferably formed of angle-iron. The metallic supports 9 may be spaced apart any suitable distance in conformity with the size of the disconnecting switch which they support, whereby openings are left between the several strips such that the blade 2 may be reached by a suitable hook-stick from the front or the rear of the mounting.

Figure 2:
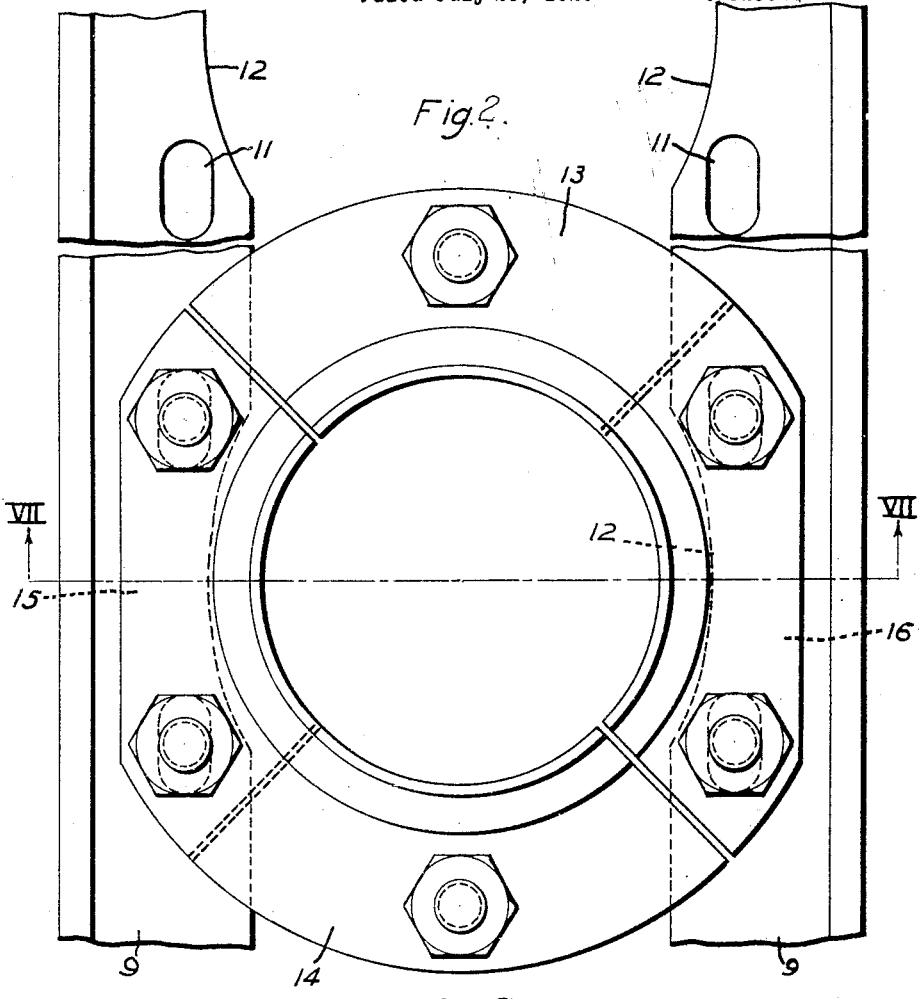
Fig. 2 is a plan view of a supporting insulator and clamp therefor.
Figure 3:
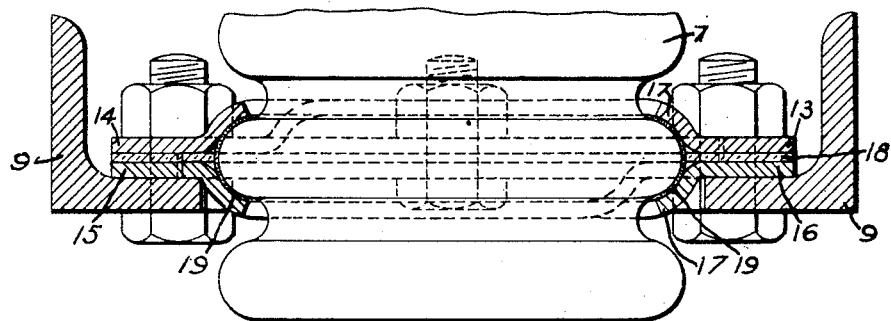
Fig. 3 is a sectional view thereof taken along the line III—III of Fig. 2.

As is shown in Figs. 2 and 3, the supports 9 are in the form of angle-irons, one flange thereof being provided with a plurality of slots 11, the edge thereof being scalloped at a plurality of points 12, which are in spaced relation to the several slots 11. The radius of the several scallops 12 is slightly greater than that of the insulators 7 and 7a in order that the insulators may pass therethrough and be capable of a certain amount of longitudinal adjustment relative to the supports 9.

As is shown in Figs. 2 and 3, the clamps 8 form an important element of my invention. Each clamp comprises four similar curved metal sections 13, 14, 15 and 16 each of which is provided with a plurality of bolt holes and an upturned flange 17. The sections 13 and 14, when assembled about the insulator 7, form a complete ring in one plane, while the sections 15 and 16 form a ring about the insulator 7 in another plane. The flanges 17 of the two rings are oppositely disposed in order to engage the opposite faces of one of the corrugations on the insulator 7. If desired, a gasket 18 may be placed between the two rings. Protecting material 19 in sheet form may also be placed between the flanges 17 and the material of the insulator 7, when desired. Referring to Fig. 2, it will be seen that each of the sections 13, 14, 15 and 16 is engaged by at least a pair of bolts and preferably by at least three bolts. It is to be understood that equivalent forms of fastening devices may be substituted in place of the bolts here shown and such substitution is within the scope of my invention.

The intersections of the rings composed of the sections 13, 14 and 15, 16 are set at right angles to each other, which causes the intersections of one ring to be opposite the midpoint of the sections comprising the other ring. It will thus be seen that it is possible to place a bolt through the sections 13 and 15 and another bolt through the sections 14 and 16 in such manner that the clamp 8, as a whole, is held in position about the insulator 7 and the clamp and insulator may then be handled as a single unit. This is an important feature of my invention for the reason that it enables the clamp 8 to be assembled on the insulator 7 and shipped as a unit therewith. To assemble the disconnecting switch in field, it is only necessary to bolt the clamp 8 to the supports 9 in the manner shown in Fig. 2.

If desired, the opposite faces of the clamp 8 may be sheared off in order to provide a clearance space between the upstanding flange of the supports 9, although this is not a necessary step in the construction of my improved disconnecting switch.

By reason of the slots 11 and the scallops 12 in the supports 9, it is possible to secure a certain amount of longitudinal adjustment of the insulator 7 with respect to the mounting. It is to be understood that in the construction shown in Fig. 1, both of the insulators 7 and 7a are provided with my improved supporting means.

In the construction shown in Fig. 1, the insulator 7 is of a greater length than the insulator 7a and encloses a conductor 20 in order to pass through the supports 9 in order to permit the terminal 6a to be attached at the rear of the mounting. Therefore, it will be understood that any modifications and variations in the form of the switch may be secured by simply re-arranging its component parts.

It will also be seen that I have provided a supporting means for the disconnecting switch which permits of ready access to the disconnecting switch by a hook-stick from either side of the mounting. I have also provided an improved form of clamp for securing the disconnecting switch to the mounting, which clamp may be mounted on the supporting insulator and they then may be handled as a unit.

Although I have described a specific embodiment of my invention, it will be obvious to those skilled in the art that various changes may be made in the details of construction without departing from the principles herein set forth. I desire, therefore, to be limited only by the spirit and scope of the appended claims.

I claim as my invention:

1. The combination with an insulator having an irregular portion, of a support therefor comprising a plurality of segments disposed to constitute two cooperating rings around the insulator with the segments in one ring in staggered relation to the segments in the other ring, and means for drawing the rings together to clamp the irregular portion of the insulator.

2. The combination with an insulator having a corrugated portion, of a support therefor comprising a plurality of like segments disposed to constitute a pair of cooperating rings around the insulator with the segments in one ring in staggered relation to the segments in the other ring, and means for drawing the rings together to clamp the corrugated portion of the insulator.

3. The combination with an insulator having a corrugated portion, of a support therefor comprising a plurality of segments provided with curved flanges disposed to constitute a pair of cooperating rings around the insulator with the segments in one ring in staggered relation to the segments in the other ring, and means for drawing the rings together to clamp the corrugated portion of the insulator.

4. The combination with an insulator having a corrugated portion, of a support therefor comprising a pair of semi-circular segments disposed to constitute a ring around the insulator, a second pair of semi-circular segments disposed to constitute a ring around the insulator for cooperation with the first named ring, and means for connecting the front portion of each segment in one ring with the rear portion of a cooperating segment in the other ring, whereby the rings may be drawn toward each other to clamp a corrugated portion of the insulator between them.

5. A supporting member for insulators comprising, in combination, a plurality of like segments arranged to constitute a pair of cooperating clamping rings with the segments in one ring overlapping the joints between the segments in the other ring and means for connecting the front portion of each segment in one ring with the rear portion of an overlapping segment in the other ring.

6. A supporting member for insulators comprising, in combination, a plurality of segments arranged to constitute a pair of cooperating rings, and means for connecting each segment in one ring with two of the segments in the other ring whereby the rings may be held in position on the insulator and be drawn together to clamp a portion of the insulator between them.

In testimony whereof, I have hereunto subscribed my name this twenty-sixth day of July 1923.

HERBERT J. CRABBS.